United States Patent
Yamada

(10) Patent No.: US 8,853,111 B2
(45) Date of Patent: *Oct. 7, 2014

(54) REFRACTORY FILLER POWDER, SEALING MATERIAL, AND METHOD FOR PRODUCING REFRACTORY FILLER POWDER

(75) Inventor: Tomoko Yamada, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 114 days.

This patent is subject to a terminal disclaimer.

(21) Appl. No.: 13/642,656

(22) PCT Filed: Apr. 8, 2011

(86) PCT No.: PCT/JP2011/058941
§ 371 (c)(1),
(2), (4) Date: Dec. 28, 2012

(87) PCT Pub. No.: WO2011/132554
PCT Pub. Date: Oct. 27, 2011

(65) Prior Publication Data
US 2013/0102453 A1    Apr. 25, 2013

(30) Foreign Application Priority Data

Apr. 22, 2010 (JP) .................................. 2010-098440

(51) Int. Cl.
C03C 8/24 (2006.01)
C04B 35/10 (2006.01)
C04B 35/453 (2006.01)
C04B 35/626 (2006.01)
C09K 3/10 (2006.01)
C01B 33/20 (2006.01)

(52) U.S. Cl.
CPC ................. C04B 35/453 (2013.01); C03C 8/24 (2013.01); C04B 35/626 (2013.01); C09K 3/1003 (2013.01); C01B 33/20 (2013.01)

USPC .............................. 501/17; 501/15; 501/128

(58) Field of Classification Search
CPC ............ C01B 33/20; C03C 8/14; C03C 8/24; C04B 35/453; C04B 35/626
USPC ............................................ 501/15, 17, 128
See application file for complete search history.

(56) References Cited

U.S. PATENT DOCUMENTS

2013/0125789 A1 *  5/2013  Enomoto et al. .............. 106/426

FOREIGN PATENT DOCUMENTS

| JP | 63-315536 | 12/1988 |
|---|---|---|
| jp | 04-114930 | 4/1992 |
| JP | 06-171980 | 6/1994 |
| JP | 08-59294 | 3/1996 |
| JP | 2009-62257 | 3/2009 |
| JP | 2009-155200 | 7/2009 |
| JP | 2011225402 | * 11/2011 |
| WO | 2008/050772 | 5/2008 |

OTHER PUBLICATIONS

International Search Report issued May 17, 2011 in International (PCT) Application No. PCT/JP2011/058941.
E. N. Bunting, "Phase Equilibria in the System SiO2-ZnO-Al2O3," Bur. Stand. J. Res., vol. 8, No. 2, p. 279-287; 1932.
International Preliminary Report on Patentability and Written Opinion of the International Searching Authority issued Dec. 20, 2012 in International (PCT) Application No. PCT/JP2011/058941.
Chinese Office Action issued Mar. 13, 2014 in corresponding Chinese Patent Application No. 201180019327.8 with English translation.

* cited by examiner

*Primary Examiner* — Karl Group
(74) *Attorney, Agent, or Firm* — Wenderoth, Lind & Ponack, L.L.P.

(57) ABSTRACT

Provided is a refractory filler powder, comprising particles, each of which has precipitates of willemite and gahnite.

20 Claims, 1 Drawing Sheet

Ts

REFRACTORY FILLER POWDER, SEALING MATERIAL, AND METHOD FOR PRODUCING REFRACTORY FILLER POWDER

TECHNICAL FIELD

The present invention relates to a refractory filler powder, a sealing material, and a manufacturing method for a refractory filler powder, and more specifically, to a refractory filler powder, a sealing material, and a manufacturing method for a refractory filler powder each suitable for sealing a display device such as a plasma display panel (hereinafter, PDP), an OLED display, a field emission display (hereinafter, FED), or a vacuum fluorescent display (hereinafter, VFD), or sealing an electronic component such as a piezoelectric vibrator package or an IC package.

BACKGROUND ART

As a sealing material, there is used a composite powder material comprising a glass powder and a refractory filler powder. This sealing material is excellent in chemical durability and heat resistance and suitable for securing airtightness as compared to a resin-based adhesive.

As the glass powder used for the sealing material, PbO—$B_2O_3$-based glass has been used (see, for example, Patent Literature 1). However, from an environmental view, a demand for removal of PbO from a glass composition has led to development of $Bi_2O_3$—$B_2O_3$-based glass. In addition, Patent Literature 2 or the like discloses that the $Bi_2O_3$—$B_2O_3$-based glass has a low melting point and has chemical durability comparable to that of the PbO—$B_2O_3$-based glass.

Meanwhile, the refractory filler powder used for the sealing material is added in order to achieve a decrease in thermal expansion coefficient and an improvement in mechanical strength, and as a material for the powder, lead titanate or the like having low expansion has been used. However, as with the glass powder, the refractory filler powder is demanded to have a composition from which PbO has been removed. Accordingly, as the refractory filler powder, there has been considered use of willemite, cordierite, tin dioxide, β-eucryptite, mullite, silica, β-quartz solid solution, aluminum titanate, zircon, and the like. Of those, willemite has low expansion and satisfactory compatibility with the $Bi_2O_3$—$B_2O_3$-based glass (hardly devitrifies the $Bi_2O_3$—$B_2O_3$-based glass at the time of sealing), and hence has attracted attention (see Patent Literature 3 and Non Patent Literature 1).

CITATION LIST

Patent Literature 1: JP 63-315536 A
Patent Literature 2: JP 08-59294 A
Patent Literature 3: JP 04-114930 A
Non Patent Literature 1: E. N. Bunting, "Phase Equilibria in the system SiO2-ZnO—Al2O3," *Bur. Stand. J. Res.*, vol. 8, No. 2, p. 279-287; 1932

SUMMARY OF INVENTION

Technical Problem

Willemite has low expansion, but as compared to other refractory filler powders, its effect of enhancing the mechanical strength of a sealing portion is small. When the sealing portion has low mechanical strength, the sealing portion is liable to break owing to mechanical impact or the like. Accordingly, the airtightness of a display device or the like is difficult to maintain.

Further, willemite is generally produced by a solid phase reaction method. When willemite is produced by the solid phase reaction method, it is necessary to fire a raw material at high temperature (specifically 1,440° C. or more) in order to complete the solid phase reaction. When the firing temperature is excessively lower than a solid phase reaction temperature, part of the raw material is liable to be left unreacted. If an unreacted raw material remains in the sealing material, an unintended crystal is liable to precipitate in glass at the time of sealing, and hence a defect in sealing is liable to occur. On the other hand, the melting point of willemite is about 1,510° C., which is close to the solid phase reaction temperature (see Non Patent Literature 1). Hence, when the firing temperature is excessively higher than the solid phase reaction temperature, the fusion of a fired substance is liable to occur at the time of firing. As a result, the pulverization efficiency of the fired substance significantly lowers, and hence the manufacturing cost of the sealing material soars.

In view of the foregoing, a technical object of the present invention is to invent a refractory filler powder which has low expansion and high strength and may be subjected to a solid phase reaction at low temperature, and a manufacturing method therefor, to thereby achieve a reduction in the cost of a sealing material and prevent the breakage of a sealing portion and a defect in sealing due to an unreacted raw material from occurring.

Solution to Problem

The inventor of the present invention has made extensive efforts, and as a result, has found that the technical object can be achieved through the use of a refractory filler powder having precipitated willemite and gahnite as a main crystal. The finding is proposed as the present invention. That is, a refractory filler powder of the present invention comprises particles, each of which has precipitates of willemite and gahnite.

In the case where willemite and gahnite are precipitated in the same particle, an effect of improving the mechanical strength of a sealing portion is larger than in the case where a main crystal phase comprises only willemite. As a result, the breakage of the sealing portion is easily prevented, and the airtightness of a display device or the like is easily maintained. Further, the precipitation of willemite allows an effect of lowering a thermal expansion coefficient to be provided certainly.

In addition, the generation of gahnite accelerates the generation of willemite, and hence a firing temperature can be lowered. As a result, the fusion of a fired substance hardly occurs, and thus the manufacturing efficiency of the refractory filler powder improves.

Second, the refractory filler powder of the present invention has a ratio between the willemite and the gahnite of, in terms of a molar ratio, 99:1 to 70:30. With this, the mechanical strength of a sealing portion can be enhanced while maintaining an effect of lowering a thermal expansion coefficient.

Third, the refractory filler powder of the present invention has a composition comprising, in terms of mol %, 60 to 79.9% of ZnO, 20 to 39.9% of $SiO_2$, and 0.1 to 10% of $Al_2O_3$. With this, the ratio between willemite and gahnite is easily adjusted to a proper one, and thus the mechanical strength of a sealing portion can be easily enhanced while maintaining an effect of lowering a thermal expansion coefficient.

Fourth, the refractory filler powder of the present invention is produced by a solid phase reaction method. The solid phase reaction method is a method of producing a refractory filler powder, comprising first blending raw materials such as oxides so as to have a desired composition, firing the blend, and then subjecting the resultant fired substance to disintegration, pulverization, and classification. According to this method, the need for melting the raw materials is obviated, and hence the manufacturing cost of the refractory filler powder can be reduced.

Fifth, a sealing material of the present invention comprises a glass powder and a refractory filler powder, wherein the refractory filler powder comprises the above-mentioned refractory filler powder.

Sixth, in the sealing material of the present invention, the content of the refractory filler powder is 0.1 to 70 vol %. With this, the thermal expansion coefficient of the sealing material is easily matched to the thermal expansion coefficient of a product to be sealed, and the mechanical strength of the sealing material can be enhanced as well.

Seventh, in the sealing material of the present invention, the glass powder comprises $Bi_2O_3$—$B_2O_3$-based glass. The $Bi_2O_3$—$B_2O_3$-based glass has a low melting point and is satisfactory in thermal stability and water resistance, and hence has such properties that sealing is easily performed at low temperature and the airtightness of a display device or the like is easily secured. In addition, the $Bi_2O_3$—$B_2O_3$-based glass has satisfactory compatibility with the refractory filler powder of the present invention. It should be noted that "-based glass" refers to glass which comprises the specified components as essential components and in which the total content of the components is 30 mol % or more, preferably 40 mol % or more, more preferably 50 mol % or more (the same applies in the following).

Eighth, the sealing material of the present invention further comprises, as another refractory filler powder, one kind or two or more kinds selected from cordierite, zircon, β-eucryptite, quartz glass, alumina, mullite, and alumina-silica-based ceramics.

Ninth, the sealing material of the present invention, further comprises an inorganic pigment.

Tenth, the sealing material of the present invention is substantially free of PbO. With this, environmental requirements in recent years can be achieved. Herein, the phrase "substantially free of PbO" refers to a case where the content of PbO in the sealing material is 1,000 ppm (by mass) or less.

Eleventh, a manufacturing method for a refractory filler powder according to the present invention comprises: blending raw materials so as to have a composition comprising, in terms of mol %, 60 to 79.9% of ZnO, 20 to 39.9% of $SiO_2$, and 0.1 to 10% of $Al_2O_3$; and making the refractory filler powder from the raw materials by a solid phase method, the refractory filler powder comprising particles, each of which has precipitates of willemite and gahnite.

DESCRIPTION OF EMBODIMENTS

Figure 1:
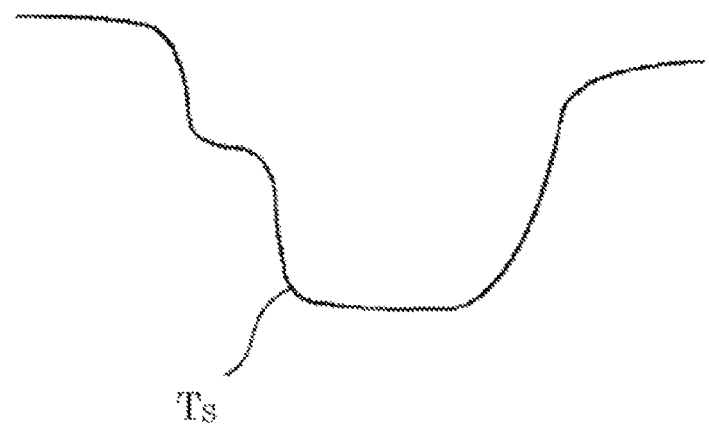
[FIG. 1] A schematic view illustrating the softening point of a sealing material when measured with a macro-type DTA apparatus.

A refractory filler powder of the present invention has a ratio between willemite and gahnite "willemite:gahnite" of, in terms of a molar ratio, preferably 99:1 to 70:30, 95:5 to 80:20, particularly preferably 90:10 to 85:15. When the ratio of gahnite is excessively large, an effect of lowering a thermal expansion coefficient is poor and a reaction temperature is increased to make the manufacturing cost of the refractory filler powder liable to soar. On the other hand, when the ratio of gahnite is excessively small, an effect of enhancing mechanical strength is poor.

The refractory filler powder of the present invention preferably has a composition comprising, in terms of mol %, 60 to 79.9% (preferably 63 to 70%) of ZnO, 20 to 39.9% (preferably 28 to 35%) of $SiO_2$, and 0.1 to 10% of $Al_2O_3$. A batch composition for preparing the refractory filler powder also preferably comprises, in terms of mol %, 60 to 79.9% of ZnO, 20 to 39.9% of $SiO_2$, and 0.1 to 10% of $Al_2O_3$. ZnO and $SiO_2$ are constituent components of a crystal. $Al_2O_3$ is a constituent component of a crystal and is also a component that functions as a reaction accelerator to lower a firing temperature. It should be noted that, in consideration of the function as a reaction accelerator, the content of $Al_2O_3$ is preferably 0.1 mol % or more, 1 mol % or more, particularly preferably 3 mol % or more. When the content of $Al_2O_3$ is less than 0.1 mol %, it hardly functions as a reaction accelerator. On the other hand, when the content of $Al_2O_3$ is excessively large, willemite is hardly generated.

The refractory filler powder of the present invention is preferably produced by a solid phase reaction method. According to this method, the need for melting the raw materials is obviated, and hence the manufacturing cost of the refractory filler powder can be reduced. Further, raw materials are preferably subjected to pulverization and mixing prior to firing. With this, the raw materials are mixed with each other in a fine powder state while being subjected to mechanical impact, and hence the specific surface area of the raw materials is enlarged. As a result, the solid phase reaction is accelerated. Further, with this, a firing time can be shortened as well. It should be noted that the firing temperature is preferably a temperature at which no fusion of a fired substance occurs and a desired crystal sufficiently precipitates. Specifically, the temperature is preferably 1,400 to 1,460° C.

In the sealing material of the present invention, the refractory filler powder has an average particle diameter $D_{50}$ of preferably 20 μm or less, particularly preferably 2 to 15 μm. With this, a sealing thickness is easily made small without letting the manufacturing cost (including a pulverization cost and a classification cost) of the refractory filler powder soar. It should be noted that, in order to allow an effect of the refractory filler powder to be provided certainly, the average particle diameter $D_{50}$ of the refractory filler powder is preferably 0.5 μm or more. Herein, the term "average particle diameter $D_{50}$" refers to a value measured by a laser diffraction method, and refers to the particle diameter of a particle in which, in a cumulative particle size distribution curve on a volumetric basis when measured by the laser diffraction method, the integrated quantity thereof is 50% when accumulated in the order starting from the particle having the smallest particle diameter.

In the sealing material of the present invention, the refractory filler has a maximum particle diameter $D_{max}$ of preferably 100 μm or less, particularly preferably 10 to 75 μm. With this, a sealing thickness is easily made small without letting the manufacturing cost of the sealing material soar. Herein, the term "maximum particle diameter $D_{max}$" refers to a value measured by a laser diffraction method, and refers to the particle diameter of a particle in which, in a cumulative particle size distribution curve on a volumetric basis when measured by the laser diffraction method, the integrated quantity thereof is 99% when accumulated in the order starting from the particle having the smallest particle diameter.

The sealing material of the present invention comprises a glass powder and a refractory filler powder, and comprises as the refractory filler powder, the refractory filler powder described above. In the sealing material of the present invention, the content of the refractory filler powder is preferably 0.1 to 70 vol %, 15 to 50 vol %, particularly preferably 20 to 40 vol %. When the content of the refractory filler powder is more than 70 vol %, the content of the glass powder is relatively small, and hence the flowability of the sealing material lowers. As a result, sealing strength is liable to lower. On the other hand, when the content of the refractory filler powder is less than 0.1 vol %, an effect of the refractory filler powder is poor. It should be noted that in the sealing material of the present invention, the content of the refractory filler powder of the present invention (refractory filler powder whose main crystal phase comprises willemite and gahnite) is preferably 0.1 to 70 vol %, 15 to 50 vol %, particularly preferably 20 to 40 vol %.

As the glass powder, there may be used glass powders based on various kinds of glass. For example, $Bi_2O_3$—$B_2O_3$-based glass, $V_2O_5$—$P_2O_5$-based glass, or $SnO$—$P_2O_5$-based glass is suitable in view of a low melting point characteristic, and $Bi_2O_3$—$B_2O_3$-based glass is particularly preferred in view of thermal stability and water resistance.

The $Bi_2O_3$—$B_2O_3$-based glass preferably has a glass composition comprising, in terms of mol % on the basis of the following oxides, 15 to 50% of $Bi_2O_3$, 15 to 50% of $B_2O_3$, and 0 to 45% (preferably 1 to 40%) of ZnO. With this, both thermal stability and a low melting point characteristic can be achieved at high levels. It should be noted that, in order to enhance thermal stability, one kind or two or more kinds of BaO, $Fe_2O_3$, and CuO are preferably added at 0.1 mol % or more.

In the sealing material of the present invention, the glass powder has an average particle diameter $D_{50}$ of preferably less than 15 μm, 0.5 to 10 μm, particularly preferably 1 to 5 μm. When the average particle diameter $D_{50}$ of the glass powder is less than 15 μm, the softening point of the glass powder lowers, and the flowability of the sealing material improves.

The sealing material of the present invention may further comprise, as another refractory filler powder, one kind or two or more kinds selected from cordierite, zircon, β-eucryptite, quartz glass, alumina, mullite, and alumina-silica-based ceramics. Those refractory filler powders are useful from the viewpoints of adjusting a thermal expansion coefficient and flowability and improving mechanical strength. Further, the content of those refractory filler powders is preferably 0 to 30 vol %, particularly preferably 0 to 10 vol % in total.

The sealing material of the present invention preferably further comprises an inorganic pigment. With this, the occurrence of a defect in the appearance of a sealing portion can be reduced. The content of the inorganic pigment is preferably 0 to 10 vol %, 0.1 to 5 vol %, particularly preferably 0.5 to 3 vol %. When the content of the inorganic pigment is more than 10 vol %, a large amount of the inorganic pigment is dissolved in the glass at the time of sealing. Thus, the thermal stability of the sealing material is liable to be impaired. As the inorganic pigment, a Cu-based oxide, an Fe-based oxide, a Cr-based oxide, an Mn-based oxide, and a spinel type complex oxide thereof are preferred.

In the sealing material of the present invention, the inorganic pigment has an average particle diameter $D_{50}$ of preferably 0.01 to 5 μm, 0.5 to 5 μm, particularly preferably 1 to 3 μm. When the average particle diameter $D_{50}$ of the inorganic pigment is more than 5 μm, the inorganic pigment is difficult to disperse uniformly in the sealing material, with the result that a local defect in sealing may occur. On the other hand, when the average particle diameter $D_{50}$ of the inorganic pigment is less than 0.01 μm, the inorganic pigment is liable to be dissolved in the glass at the time of sealing. Thus, the thermal stability of the sealing material is liable to be impaired.

The sealing material of the present invention may further comprise glass fiber, glass beads, silica beads, resin beads, or the like as a spacer at up to 10 vol % in order to achieve a uniform sealing thickness.

The sealing material of the present invention has a thermal expansion coefficient of preferably $80\times10^{-7}/°$ C. or less, particularly preferably $75\times10^{-7}/°$ C. or less. With this, a stress remaining in an object to be sealed or a sealing portion can be reduced. As a result, a situation in which the sealing portion undergoes stress cracking to impair the airtightness of a display device or the like is easily prevented. Herein, the term "thermal expansion coefficient" refers to a value measured with a push-rod type thermal expansion coefficient measurement (TMA) apparatus in the temperature range of 30 to 300° C.

The sealing material of the present invention preferably has a softening point of preferably 475° C. or less, particularly preferably 460° C. or less. With this, the flowability of the sealing material can be enhanced. Herein, the term "softening point" refers to a value measured with a differential thermal analysis (DTA) apparatus, and may be measured under such conditions that, for example, the measurement is performed with a macro-type DTA apparatus in the air at a temperature increase rate of 10° C./min and started at room temperature. It should be noted that in the case of the macro-type DTA, a temperature at a fourth inflection point illustrated in FIG. 1 (Ts) corresponds to the softening point.

The sealing material of the present invention has a crystallization temperature of preferably 550° C. or more, 570° C. or more, particularly preferably 600° C. or more. With this, in each of a primary firing step (glazing step, debinding step) and a secondary firing step (sealing step), a crystal hardly precipitates in the glass. Thus, the airtightness of a display device or the like is easily secured. Herein, the "crystallization temperature" refers to a crystallization peak temperature measured with a DTA apparatus, and may be measured under such conditions that, for example, the measurement is performed with a macro-type DTA apparatus in the air at a temperature increase rate of 10° C./min and started at room temperature.

The sealing material of the present invention may be used in a powder form. However, the sealing material is preferably kneaded homogeneously with a vehicle and processed into a paste in view of easiness of handling. The vehicle generally comprises a solvent and a resin. The resin is added for the purpose of adjusting the viscosity of the paste. Further, a surfactant, a thickener, or the like may also be added thereto, if required. The produced paste is applied onto a surface of an object to be sealed by means of a coating machine such as a dispenser or a screen printing machine.

As the resin, there may be used an acrylic acid ester (acrylic resin), ethylcellulose, a polyethylene glycol derivative, nitrocellulose, polymethylstyrene, polyethylene carbonate, a methacrylic acid ester, and the like. In particular, an acrylic acid ester and nitrocellulose are preferred because of good thermolytic property.

As the solvent, there may be used N,N'-dimethyl formamide (DMF), α-terpineol, a higher alcohol, γ-butyrolactone (γ-BL), tetralin, butylcarbitol acetate, ethyl acetate, isoamyl acetate, diethylene glycol monoethyl ether, diethylene glycol monoethyl ether acetate, benzyl alcohol, toluene, 3-methoxy-3-methylbutanol, water, triethylene glycol monomethyl ether, triethylene glycol dimethyl ether, dipropylene glycol monomethyl ether, dipropylene glycol monobutyl ether, tripropylene glycol monomethyl ether, tripropylene glycol monobutyl ether, propylene carbonate, dimethyl sulfoxide (DMSO), N-methyl-2-pyrrolidone, and the like. In particular, α-terpineol is preferred because of high viscosity and good solubility of a resin and the like.

The sealing material of the present invention is preferably used after being sintered into a tablet having a predetermined shape. For the sealing of an exhaust pipe of a PDP or the like, a tablet formed into a ring shape (press frit/sintered glass body/formed glass body) is used. The tablet has formed therein an insertion hole for the insertion of the exhaust pipe, and the exhaust pipe is inserted into the insertion hole. In addition, the forward end portion of the exhaust pipe is positioned at an exhaust hole of the panel and fixed thereto with a clip or the like. After that, the tablet is softened in the secondary firing step to attach the exhaust pipe to the panel. When the sealing material of the present invention is processed into a tablet, upon attachment of the exhaust pipe, the exhaust pipe is easily connected to an exhaust system and the slanting of the exhaust pipe is reduced. In addition, the attachment is easily performed so as to keep reliability in airtightness while maintaining the ability of the PDP or the like to emit light.

The tablet is produced through a plurality of times of heat treatment. First, a resin and a solvent are added to the sealing material to prepare a slurry. After that, the slurry is loaded into a granulation apparatus such as a spray dryer to produce granules. At this time, the granules are dried at a temperature at which the solvent is volatilized (about 100 to 200° C.). In addition, the produced granules are loaded into a mold designed to have predetermined dimensions and then subjected to dry press molding into a ring shape to produce a pressed body. Next, in a heat treatment furnace such as a belt furnace, the resin remaining in the pressed body is decomposed and volatilized and then the resultant is sintered at a temperature near the softening point of the sealing material. Thus, a tablet having a predetermined shape may be produced. Further, the sintering may be performed a plurality of times. With this, the strength of the tablet is improved, which facilitates the prevention of deficit, breakage, and the like in the tablet from occurring.

The sealing material of the present invention is preferably used as a tablet-integrated exhaust pipe obtained by forming the sealing material into a tablet and attaching the tablet to the forward end portion of an exhaust pipe having an enlarged diameter. With this, the exhaust hole serves as an origin, the need for positioning of the exhaust pipe and the tablet is obviated, and the operation of attaching the exhaust pipe can be simplified.

In the production of the tablet-integrated exhaust pipe, it is necessary to first performing heat treatment under a state in which the tablet is brought into contact with the forward end portion of an exhaust pipe to bond the tablet to the forward end portion of the exhaust pipe in advance. In this case, a method comprising fixing the exhaust pipe with a jig, inserting the tablet into the exhaust pipe in this state, and subjecting the whole to heat treatment is preferred. The jig for fixing the exhaust pipe is preferably one made of a material that does not cause the fusion of the tablet, such as a carbon jig. Further, the exhaust pipe and the tablet may be bonded at around the softening point of the sealing material for a short period of time, for example, about 5 to 10 minutes.

Figure 2:
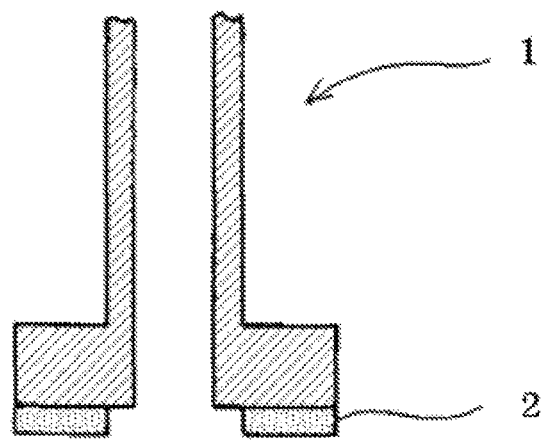
[FIG. 2] A cross-sectional conceptual view illustrating a mode of a tablet-integrated exhaust pipe.

As the exhaust pipe, $SiO_2$—$Al_2O_3$—$B_2O_3$-based glass comprising a predetermined amount of an alkali metal oxide is suitable, and an FE-2 manufactured by Nippon Electric Glass Co., Ltd. is particularly suitable. This exhaust pipe has a thermal expansion coefficient of $85 \times 10^{-7}/°$ C., an upper temperature limit of 550° C., and dimensions of, for example, an outer diameter of 5 mm and an inner diameter of 3.5 mm. Further, when the diameter of the forward end portion of the exhaust pipe is enlarged, self-supporting stability can be enhanced. In that case, the forward end portion of the exhaust pipe preferably has a flare shape or a flange shape. As a method of enlarging the diameter of the forward end portion of the exhaust pipe, any of various methods may be adopted. In particular, a method comprising heating the forward end portion of an exhaust pipe with a gas burner while rotating the pipe and processing the forward end portion into a predetermined shape with several kinds of jigs is preferred because of excellent mass productivity. FIG. 2 illustrates an example of the tablet-integrated exhaust pipe having this construction. That is, FIG. 2 is a cross-sectional view of the tablet-integrated exhaust pipe, in which the forward end portion of an exhaust pipe 1 has an enlarged diameter and a tablet 2 is bonded to the forward end portion on the panel side of the exhaust pipe.

The tablet-integrated exhaust pipe preferably has the following structure. That is, the forward end portion of an exhaust pipe having an enlarged diameter has attached thereto a tablet and a high melting point tablet, and the tablet is attached on the forward end portion side of the exhaust pipe having an enlarged diameter, and the high melting point tablet is attached on the back end portion side relative to the tablet. Through the adoption of this construction, a contact area with a panel or the like when the exhaust pipe is attached to the panel or the like is larger than in the case of using an exhaust pipe alone. Thus, the exhaust pipe is easily attached to the panel perpendicularly. Further, when the tablet is fixed to the exhaust pipe, the high melting point tablet may be disposed between the tablet and the jig, and hence no special jig is required. As a result, the manufacturing process for the tablet-integrated exhaust pipe can be simplified.

Figure 3:
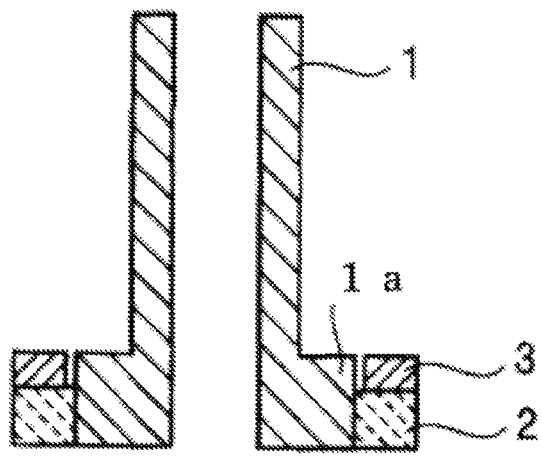
[FIG. 3] A cross-sectional conceptual view illustrating a mode of a tablet-integrated exhaust pipe.

In the tablet-integrated exhaust pipe, a construction in which the tablet is bonded to an outer periphery surface of the forward end portion of the exhaust pipe is preferred, and a construction in which the tablet is bonded to only the outer periphery surface of the forward end portion of the exhaust pipe and not bonded to a forward end surface of the forward end portion of the exhaust pipe, i.e., not bonded to a surface to be brought into contact with a panel or the like is more preferred. With this, in a vacuum exhaustion step, a situation in which a constituent component of the tablet flows into the exhaust hole is easily prevented. Further, the high melting point tablet is preferably fixed to the exhaust pipe through the tablet rather than being directly bonded to the exhaust pipe because, in the secondary firing step, the exhaust pipe can be sealed under pressure under a state in which a portion corresponding to the high melting point tablet is fixed with a clip. FIG. 3 illustrates an example of the tablet-integrated exhaust pipe having this construction. That is, FIG. 3 is a cross-sectional view of the tablet-integrated exhaust pipe, in which the forward end portion of the exhaust pipe 1 has an enlarged diameter, and the tablet 2 is bonded to the forward end portion on the outer peripheral surface of a flange portion 1a of the exhaust pipe 1. On the other hand, a high melting point tablet 3 is not bonded to the outer peripheral surface side of the exhaust pipe 1. Further, the tablet 2 is attached on the forward end portion side of the flange portion 1a, and the high melting point tablet 3 is attached on the back end side of the flange portion 1a relative to the tablet 2.

Here, as the high melting point tablet, an ST-4 or FN-13 manufactured by Nippon Electric Glass Co., Ltd. is preferred. A production method for the high melting point tablet is the same as the production method for the tablet described above when the high melting point tablet is made of a glass material. Further, as the high melting point tablet, ceramics, a metal, or the like may also be used.

EXAMPLES

Example 1

Hereinafter, the present invention is described in detail based on examples.

Table 1 shows examples (Sample Nos. 1 to 4) of the refractory filler powder of the present invention and comparative examples (Sample Nos. 5 to 7).

TABLE 1

|  |  | Example | | | | Comparative Example | | |
| --- | --- | --- | --- | --- | --- | --- | --- | --- |
|  |  | No. 1 | No. 2 | No. 3 | No. 4 | No. 5 | No. 6 | No. 7 |
| Refractory filler powder composition (mol %) | ZnO | 66.1 | 65.5 | 65.5 | 64.9 | 66.7 | 66.7 | 50.0 |
|  | $SiO_2$ | 32.2 | 31.0 | 31.0 | 29.8 | 33.0 | 33.3 | 0 |
|  | $Al_2O_3$ | 1.7 | 3.5 | 3.5 | 5.3 | 0 | 0 | 50.0 |
| Molar ratio "willemite:gahnite" |  | 95:5 | 90:10 | 90:10 | 85:15 | 100:0 | 100:0 | 0:100 |
| Firing temperature (° C.) |  | 1,440 | 1,420 | 1,440 | 1,420 | 1,430 | 1,470 | 1,500 |
| Presence or absence of fusion |  | Absent | Absent | Absent | Absent | Absent | Present | Absent |
| Presence or absence of unreacted raw material |  | Absent | Absent | Absent | Absent | Present | Absent | Absent |

Each refractory filler powder in the table was produced by a solid phase reaction method. First, various oxide raw materials were blended so as to have a composition in the table, and were subjected to pulverization and mixing with a ball mill for 10 minutes to 3 hours. The pulverized mixture was loaded into an alumina crucible, and fired at a firing temperature in the table for 20 hours. Finally, the resultant fired substance was subjected to disintegration and then to pulverization with a ball mill, followed by classification with a 250 mesh-pass sieve, to provide a refractory filler powder having an average particle diameter $D_{50}$ of 12 μm. For each refractory filler, the presence or absence of the fusion of the fired substance and the presence or absence of an unreacted raw material (mainly ZnO) were evaluated. Table 1 shows the results.

As apparent from Table 1, each of Sample Nos. 1 to 4 comprises $Al_2O_3$ in its composition, and hence has willemite and gahnite precipitated as a main crystal. Accordingly, an unreacted substance was absent and the solid phase reaction had been completed even at a firing temperature of 1,420 to 1,440° C. On the other hand, each of Sample Nos. 5 and 6 does not comprise $Al_2O_3$ in its composition, and hence has no gahnite precipitated. Accordingly, an unreacted raw material remained when the firing temperature was 1,430° C., and the fusion of the fired substance occurred when the firing temperature was 1,470° C., with the result that the disintegration of the fired substance was difficult. It should be noted that Sample No. 7 has no willemite precipitated, and hence is considered to have a poor effect of lowering a thermal expansion coefficient.

Example 2

Table 2 shows an example of the glass composition of $Bi_2O_3$—$B_2O_3$-based glass and its characteristics.

TABLE 2

| $Bi_2O_3$—$B_2O_3$-based glass glass powder | | |
| --- | --- | --- |
| Glass composition (mol %) | $Bi_2O_3$ | 38.2 |
|  | $B_2O_3$ | 26.9 |
|  | ZnO | 18.4 |
|  | BaO | 8.8 |
|  | CuO | 6.6 |
|  | $Fe_2O_3$ | 0.7 |
|  | $Sb_2O_3$ | 0.5 |
| Glass transition point (° C.) |  | 357 |
| Softening point (° C.) |  | 430 |
| Thermal expansion coefficient ($\times 10^{-7}$/° C.) |  | 110 |

The $Bi_2O_3$—$B_2O_3$-based glass shown in Table 2 was prepared as follows. First, a glass batch was prepared by blending raw materials such as various oxides and carbonates so as to have the glass composition in the table. The glass batch was loaded into a platinum crucible and melted at 1,100° C. for 1 hour. Next, the molten glass was formed into a flake shape with a water-cooling roller. Finally, the glass having a flake shape was subjected to pulverization with a ball mill and then to classification with a 200 mesh-pass sieve to provide a glass powder having an average particle diameter $D_{50}$ of 10 μm.

The glass transition point and softening point are values each measured with a DTA apparatus under the air atmosphere. It should be noted that the measurement was started at room temperature and a temperature increase rate was set to 10° C./min.

The thermal expansion coefficient is a value measured with a TMA apparatus. A measurement temperature range was set to 30 to 300° C. It should be noted that as a measurement sample, a product obtained by processing a dense sintered body of a glass powder into a predetermined shape was used.

Table 3 shows examples (Samples A to D) of the sealing material of the present invention and comparative examples (Samples E and F).

TABLE 3

|  |  | Example | | | | Comparative Example | |
| --- | --- | --- | --- | --- | --- | --- | --- |
|  |  | A | B | C | D | E | F |
| Sealing material (vol %) | Glass powder | 65 | 65 | 65 | 65 | 65 | 65 |
|  | Refractory filler powder | No. 1 / 35 | No. 2 / 35 | No. 3 / 35 | No. 4 / 35 | No. 6 / 35 | No. 7 / 35 |
| Glass transition point (° C.) |  | 350 | 350 | 350 | 347 | 348 | 349 |
| Softening point (° C.) |  | 444 | 446 | 451 | 444 | 455 | 460 |
| Thermal expansion coefficient ($\times 10^{-7}$/° C.) |  | 71.6 | 73.2 | 73.1 | 74.2 | 71.5 | 91.3 |
| Bending strength (MPa) |  | 63.2 | 66.8 | 67.2 | 66.4 | 61.5 | 114.2 |

Each of the refractory filler powders shown in Table 1 and the glass powder shown in Table 2 were mixed at a volume ratio shown in Table 3 to produce each sample in Table 3. For each sample, the glass transition point, softening point, thermal expansion coefficient, and bending strength were evaluated. Table 3 shows the results.

The glass transition point and softening point are values each measured with a DTA apparatus under the air atmosphere. It should be noted that the measurement was started at room temperature and a temperature increase rate was set to 10° C./min.

The thermal expansion coefficient is a value measured with a TMA apparatus. A measurement temperature range was set to 30 to 300° C. It should be noted that as a measurement sample, a product obtained by processing a dense sintered body of a sealing material into a predetermined shape was used.

The bending strength is a value measured by a three-point bending test in accordance with JIS R1601: Test Method for Bending Strength of Fine Ceramics.

As apparent from Table 3, Samples A to D each had a low thermal expansion coefficient and high bending strength. On the other hand, Sample E had lower bending strength than Samples A to D. It should be noted that Sample E, in which the manufacturing cost of the refractory filler powder is high, is considered to require higher manufacturing cost than Samples A to D. Further, Sample F had a higher thermal expansion coefficient than Samples A to D.

INDUSTRIAL APPLICABILITY

The refractory filler powder and the sealing material using the filler of the present invention are each suitable for (1) sealing of a display device such as a PDP, an OLED display, a FED, or a VFD, (2) sealing of an electronic component such as a piezoelectric vibrator package or an IC package, (3) sealing between cores of magnetic heads or a core and a slider, (4) sealing of a solar cell such as a silicon solar cell or a dye-sensitized solar cell, and (5) sealing of a lighting device such as OLED lighting.

The invention claimed is:

1. A refractory filler powder comprising particles, each of which has precipitates of willemite and gahnite.

2. The refractory filler powder according to claim 1, which has a ratio between the willemite and the gahnite of, in terms of a molar ratio, 99:1 to 70:30.

3. The refractory filler powder according to claim 1, which has a composition comprising, in terms of mol %, 60 to 79.9% of ZnO, 20 to 39.9% of $SiO_2$, and 0.1 to 10% of $Al_2O_3$.

4. The refractory filler powder according to claim 1, which is produced by a solid phase reaction method.

5. A sealing material comprising:
a glass powder; and
a refractory filler powder,
wherein the refractory filler powder comprises the refractory filler powder according to claim 1.

6. The sealing material according to claim 5, wherein a content of the refractory filler powder is 0.1 to 70 vol %.

7. The sealing material according to claim 5, wherein the glass powder comprises $Bi_2O_3$—$B_2O_3$-based glass.

8. The sealing material according to claim 5, further comprising, as another refractory filler powder, one kind or two or more kinds selected from cordierite, zircon, β-eucryptite, quartz glass, alumina, mullite, and alumina-silica-based ceramics.

9. The sealing material according to claim 5, further comprising an inorganic pigment.

10. The sealing material according to claim 5, which is substantially free of PbO.

11. A manufacturing method for a refractory filler powder, the method comprising:
blending raw materials so as to have a composition comprising, in terms of mol %, 60 to 79.9% of ZnO, 20 to 39.9% of $SiO_2$, and 0.1 to 10% of $Al_2O_3$; and
making the refractory filler powder from the raw materials by a solid phase reaction method, the refractory filler powder comprising particles, each of which has precipitates of willemite and gahnite.

12. The refractory filler powder according to claim 2, which has a composition comprising, in terms of mol %, 60 to 79.9% of ZnO, 20 to 39.9% of $SiO_2$, and 0.1 to 10% of $Al_2O_3$.

13. The refractory filler powder according to claim 2, which is produced by a solid phase reaction method.

14. The refractory filler powder according to claim 3, which is produced by a solid phase reaction method.

15. The refractory filler powder according to claim 12, which is produced by a solid phase reaction method.

16. A sealing material comprising:
a glass powder; and
a refractory filler powder,
wherein the refractory filler powder comprises the refractory filler powder according to claim 2.

17. A sealing material comprising:
a glass powder; and
a refractory filler powder,
wherein the refractory filler powder comprises the refractory filler powder according to claim 3.

18. A sealing material comprising:
a glass powder; and
a refractory filler powder,
wherein the refractory filler powder comprises the refractory filler powder according to claim 4.

19. A sealing material comprising:
a glass powder; and
a refractory filler powder,
wherein the refractory filler powder comprises the refractory filler powder according to claim 12.

20. A sealing material comprising:
a glass powder; and
a refractory filler powder,
wherein the refractory filler powder comprises the refractory filler powder according to claim 13.

* * * * *